(12) United States Patent
Monden

(10) Patent No.: US 7,991,204 B2
(45) Date of Patent: Aug. 2, 2011

(54) THRESHOLD DETERMINING DEVICE, METHOD AND PROGRAM, AND PERSONAL AUTHENTICATION SYSTEM

(75) Inventor: Akira Monden, Tokyo (JP)

(73) Assignee: NEC Corporation, Tokyo (JP)

( * ) Notice: Subject to any disclaimer, the term of this patent is extended or adjusted under 35 U.S.C. 154(b) by 1086 days.

(21) Appl. No.: 11/792,840

(22) PCT Filed: Jan. 12, 2006

(86) PCT No.: PCT/JP2006/000284
§ 371 (c)(1),
(2), (4) Date: Jun. 11, 2007

(87) PCT Pub. No.: WO2006/077764
PCT Pub. Date: Jul. 27, 2006

(65) Prior Publication Data
US 2008/0089562 A1 Apr. 17, 2008

(30) Foreign Application Priority Data
Jan. 21, 2005 (JP) ................................. 2005-013493

(51) Int. Cl.
*G06K 9/62* (2006.01)
(52) U.S. Cl. ....................................................... 382/124
(58) Field of Classification Search .................. None
See application file for complete search history.

(56) References Cited

U.S. PATENT DOCUMENTS
6,526,396 B1  2/2003  Hiratsuka et al. ............... 706/52
2003/0051147 A1*  3/2003  Maeda et al. .................. 713/186

FOREIGN PATENT DOCUMENTS
| JP | 06-208611 | 7/1994 |
| JP | 06-274628 | 9/1994 |
| JP | 2000-182057 | 6/2000 |
| JP | 2000-215313 | 8/2000 |
| JP | 2001-021309 | 1/2001 |

\* cited by examiner

*Primary Examiner* — Brian P Werner
(74) *Attorney, Agent, or Firm* — Scully, Scott, Murphy & Presser, P.C.

(57) ABSTRACT

Provided is a threshold determining device for determining a threshold, at which the false matching rate of each data to become less than a required value becomes a required assurance value or more. The threshold determining device comprises an individual threshold evaluation unit, an individual threshold distribution evaluation unit, and an overall threshold determination unit. The threshold determining device determines a similarity of each data to others for each data, determines the threshold of the similarity satisfying a predetermined false matching rate, for each data, determines an individual threshold distribution of the data for each threshold on each of the data, and determines the threshold common to the entire data, as overall data on the basis of the individual threshold distribution.

21 Claims, 6 Drawing Sheets

THRESHOLD DETERMINING DEVICE, METHOD AND PROGRAM, AND PERSONAL AUTHENTICATION SYSTEM

TECHNICAL FIELD

The present invention relates to a threshold determining device and the like determining a threshold for a verification evaluation value with respect to similarity of each data, such as fingerprints.

BACKGROUND ART

As a method for authenticating individuals, biometric authentication is known which utilizes physical characteristics. This is to examine whether a physical characteristic peculiar to each individual, such as a fingerprint or a face, is the same or not that one has been enrolled, and to authenticate an identical person if those are determined to be identical. For example, in a case of fingerprint authentication, a person who would like to be authenticated enrolls a fingerprint data (a template) of him/her for verification in an authentication system in advance, and when the person would like to be authenticated, an inputted fingerprint data and the template are compared, then determination whether it is the enrolled person or not can be done with a magnitude correlation between a verification evaluation value, such as similarity, and a prescribed threshold.

Then, if the threshold is set in a value which is exact too much, a false non-matching rate (an error rate in which identical things are determined as different things) becomes high, which is inconvenient for an authentic enrollee. On the contrary, if the threshold is set in a wider range of values, a false matching rate (an error rate in which different things are determined as identical things) becomes high, which increases a risk where non-enrollee can be authenticated. As described, the false matching rate and the false non-matching rate are determined when the threshold is fixed, and they are in a relationship of trade-off.

A desirable threshold needs to be determined depending on a required quality of authentication system. It is a serious error that the authentication system accepts non-enrollee by mistake, so the false matching rate needs to be lower than a prescribed value in the authentication system which is required security. Accordingly, the threshold needs to be determined so as to reach a required false matching rate.

the relationship between the threshold and the false matching rate can be obtained by verifying a large number of data for test practically to examine the false matching rates in cases with various thresholds, as shown in Non-patent document 1. If the threshold is determined to satisfy the required false matching rate in the authentication system, the error rate of accepting a non-enrollee can be equal to a required value or less.

However, the threshold determined as in the above is determined in order that an average false matching rate of all data is to be equal to the required value or less, while the false matching rates for each data are different according to the data. Accordingly, the thresholds need to be determined so that the false matching rates for each data can be evaluated. In the individual authentication method described in Patent Document 1, relationships between thresholds and false matching rates/false non-matching rates at each individual are obtained and the thresholds are determined so that a problem where the false matching rates or the false non-matching rates becomes to be different depending on individuals is solved.

Non-Patent Document 1: Japanese Industrial Standards Committee (JISC), TS/TR number "X0053", TS/TR name "Evaluation method for accuracy of fingerprint authentication systems"

Patent-Document 1: Japanese Patent Application Laid-open No. 2001-21309

DISCLOSURE OF THE INVENTION

Problems to be Solved by the Invention

A first problem is that verification accuracy of each data cannot be known when the verification accuracy is evaluated as in Non-Patent Document 1. The reason is that the accuracy evaluated with the method shown in Non-Patent Document 1 is average accuracy of all data, so that the false matching rates are various on each data when matching/non-matching is determined with one same threshold.

A second problem is that the thresholds cannot be determined when the system is designed with a method of Patent Document 1. With this method, the thresholds need to be determined with a number of verification at every enrollment processing where users enroll template data in the authentication system. The reason is that the thresholds are obtained with verification experiments at each individual. Therefore, the thresholds cannot be determined in advance, and it is troublesome that a number of data essential for verification need to be inputted on the enrollment processing, and besides the enrollment processing takes time for a number of data to be performed verification processing.

So, an object of the present invention is to provide a threshold determining device and the like capable of determining individual thresholds which can assure that the false matching rate of each enrolled data is less than a prescribed value with specific proportion. Further, another object of the present invention is to provide a threshold determining device and the like capable of determining thresholds at the time of designing.

Means of Solving the Problems

In order to achieve the aforementioned objects, a threshold determining device according to the present invention comprises: an individual threshold evaluation unit for obtaining a verification evaluation value between a plurality of data for each data, and obtaining a threshold for the verification evaluation value satisfying a prescribed false matching rate for each data as an individual threshold; an individual threshold distribution evaluation unit for obtaining distribution of the individual thresholds having number of the data for each individual threshold, with respect to an individual threshold at each data obtained by the individual threshold evaluation unit; and a calculation unit for obtaining an overall threshold based on the distribution of the individual thresholds obtained by the individual threshold distribution evaluation unit.

The threshold determining device according to the present invention comprises the individual threshold evaluation unit, the individual threshold distribution evaluation unit, and the threshold determining unit, and operates to determine thresholds with which the prescribed false matching rate can be achieved at a specific proportion. The above structure is applied so as to determine thresholds with which false non-matching rates of each data, not of average of all data, can reach a prescribed value. Accordingly, the first object of the present invention can be achieved. Further, the thresholds are determined utilizing test data at the time of system designing, and thereby the second object of the present invention can be achieved.

Moreover, the calculation unit needs to have either one of functions of obtaining a threshold common to all of the plural data as the overall threshold, or obtaining a relationship between the overall threshold and a proportion of data having the individual thresholds satisfying the overall threshold to the whole data based on the distribution of the individual thresholds obtained by the individual threshold distribution evaluation unit.

Further, the verification evaluation value may be similarity or distance, the data may be biometric information identifying an individual, and the biometric information may be fingerprint data.

The personal authentication system according to the present invention is to perform personal authentication by utilizing the overall threshold obtained by the threshold determining device according to the present invention, or to perform personal authentication by utilizing the overall threshold in accordance with required security levels in the aforementioned authentication, based on the relationship obtained by the threshold determining device according to the present invention.

The threshold determining method according to the present invention comprises: an individual threshold evaluation step of obtaining a verification evaluation value for each data in a plurality of data with respect to other data, and obtaining a threshold of the verification evaluation value satisfying a prescribed false matching rate for each data as an individual threshold; an individual threshold distribution evaluation step of obtaining distribution of the individual thresholds having number of the data for each individual threshold with respect to the individual threshold at each data obtained in the individual threshold evaluation step; and a calculation step of obtaining an overall threshold based on the distribution of the individual thresholds obtained in the individual threshold distribution evaluation step.

A threshold determining program according to the present invention makes a computer constituting the threshold determining device for determining a threshold execute the functions of: obtaining a verification evaluation value between a plurality of data for each data, and obtaining a threshold of the verification evaluation value satisfying a prescribed false matching rate as an individual threshold for each data; obtaining distribution of the individual thresholds having number of the data for each individual threshold with respect to the individual thresholds at each data obtained by the individual threshold evaluation unit; and obtaining an overall threshold based on the distribution of the individual thresholds obtained by the individual threshold distribution evaluation unit.

Further, the present invention can be structured as follow. That is, the present invention may (1) evaluate similarity between one data of the test data and other plural data apart from the data, obtain thresholds for each data with which a proportion of the similarity over the threshold does not exceed a required false matching rate, and evaluate occurrence distribution of the thresholds of each data so as to obtain a relationship between the overall threshold and a proportion of the overall threshold exceeding the thresholds of each data. Also, the present invention may (2) determine the overall threshold so that a proportion of the overall threshold exceeding the thresholds of each data satisfies a required assurance rate according to the relationship between the overall threshold and the proportion of the overall threshold exceeding the thresholds of each data.

Advantageous Effects of the Present Invention

A first advantageous effect is that achieving the prescribed false matching rate can be assured at specific rate with respect to each data. The reason is that a relationship between the threshold and the false matching rate is not obtained as an average relationship of all data, but that thresholds with which prescribed non-matching rates can be achieved at each data are obtained, and that the occurrence distribution of the thresholds is obtained so as to determine the overall threshold including a prescribed proportion of data.

A second advantageous effect is that thresholds can be determined at the time of designing. The reason is that the thresholds are determined according to the distribution of thresholds with which a prescribed threshold with test data can be achieved, and that information of each individual does not required at the time of the enrollment processing.

BEST MODE FOR CARRYING OUT THE PRESENT INVENTION

Figure 1:
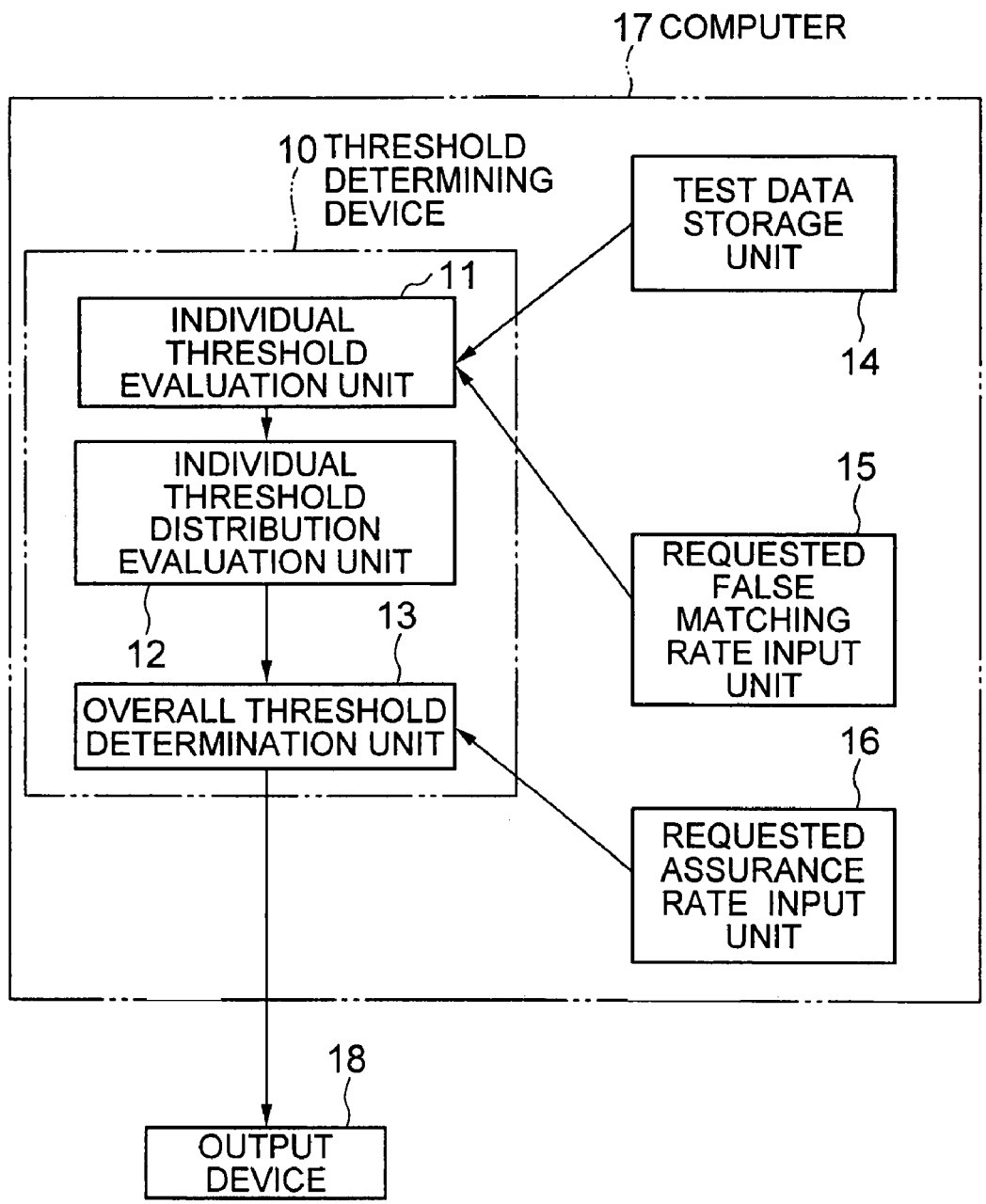
FIG. 1 is a block diagram showing a first embodiment of a threshold determining device according to the present invention.

FIG. 1 is a block diagram showing a first embodiment of the threshold determining device of the present invention. Hereinafter, the present invention will be explained with reference to this drawing.

A threshold determining device 10 according to the present embodiment comprises basically an individual threshold evaluation unit 11, an individual threshold distribution evaluation unit 12, and an overall threshold determination unit 13. The individual threshold evaluation unit 11 obtains similarity for each data in a plurality of data with respect to other data, and obtains thresholds of the similarity satisfying the prescribed false matching rate at each data as individual thresholds. The individual threshold distribution evaluation unit 12 obtains distribution of the individual thresholds having number of the data for each individual threshold, with respect to individual thresholds at each data obtained by the individual threshold evaluation unit 11. The overall threshold determination unit 13 obtains a threshold common to the whole of the plurality of data as an overall threshold based on the distribution of individual thresholds obtained by the individual threshold distribution evaluation unit 12. In the present embodiment, the overall threshold determination unit 13 is used for the calculating unit to obtain the overall threshold based on the distribution of the individual thresholds obtained by the individual threshold distribution evaluation unit.

The present invention will be explained in more detail. The threshold determining device 10 is realized within a computer 17 which operates with program control. The computer 17 is connected with an output device 18 such as a display, and the like. The computer 17 comprises the individual threshold evaluation unit 11, the individual threshold distribution evaluation unit 12, and the overall threshold determination unit 13, and besides, a test data storage unit 14, a required false matching rate input unit 15, and a required assurance rate input unit 16. Each of these units operates generally as follows.

The individual threshold evaluation unit 11 verifies the test data stored in the test data storage unit 14 with each other so that thresholds with which the required false matching rate inputted by the required false matching rate input unit 15 can be achieved are evaluated at each data. The individual threshold distribution evaluation unit 12 evaluates the occurrence distribution with respect to the individual thresholds at each data with which the required false matching rate obtained by the individual threshold evaluation unit 11 can be achieved. The overall threshold determination unit 13 determines the overall threshold so that the required false matching rate can be achieved at the proportion inputted by the required assurance rate input unit 16 based on the distribution of the individual thresholds obtained by the individual threshold distribution evaluation unit 12. The threshold determined by the overall threshold determination unit 13 is outputted from the output device 18.

Figure 2:
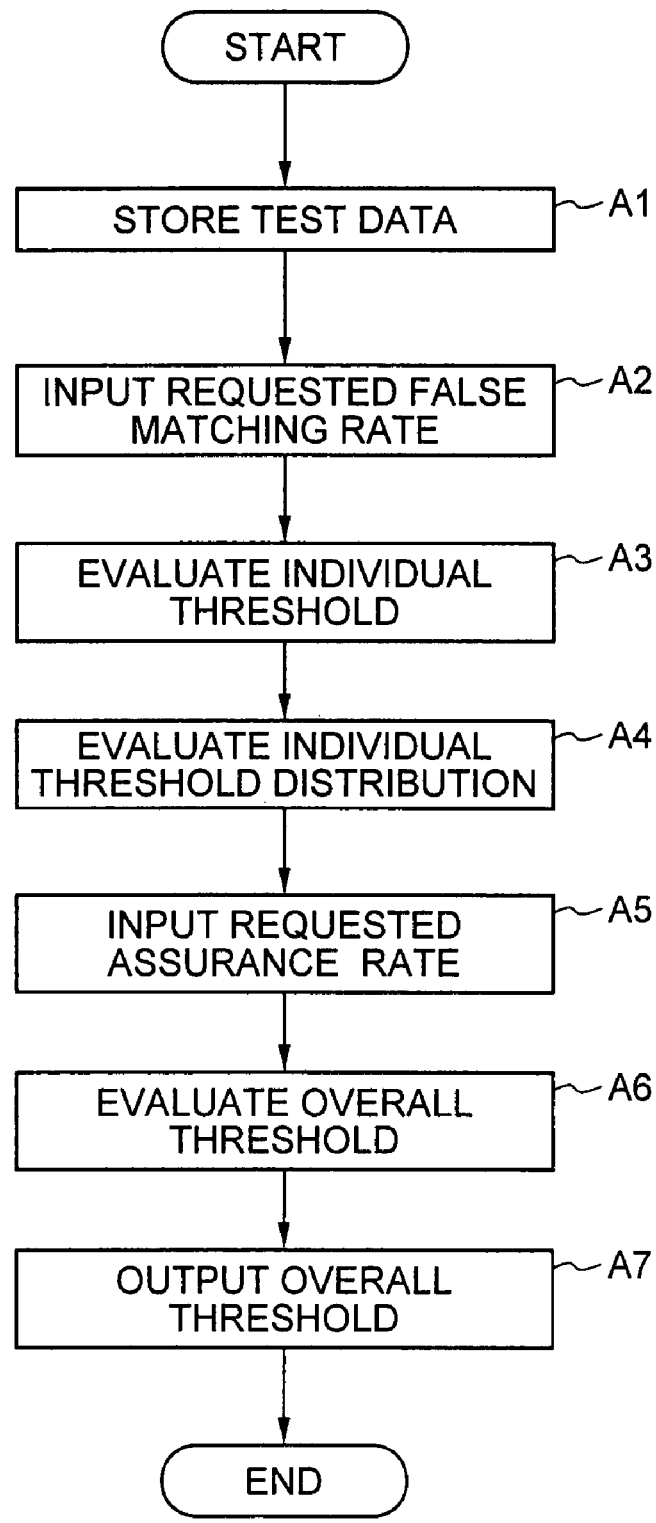
FIG. 2 is a flowchart showing operations of the threshold determining device of FIG. 1.

FIG. 2 is a flowchart showing operations of the threshold determining device 10. Hereinafter, the operations of the threshold determining device 10 will be explained with reference to FIGS. 1 and 2.

Firstly, the test data storage unit 14 stores test data (Step A1), and the required false matching rate input unit 15 inputs a required false matching rate (Step A2). Either of Step A1 or Step A2 may be precedent in the sequence. Next, having verified a number of test data, the individual threshold evaluation unit 11 obtains thresholds which are less than the false matching rate inputted by the required false matching rate input unit 15 at each data (Step A3). Then, the individual threshold distribution evaluation unit 12 examines the occurrence distribution with respect to the individual thresholds at each data obtained by the individual threshold evaluation unit 11 (Step A4). Next, the required assurance rate input unit 16 inputs a required value which is assumable proportion of the false matching rates at each data which are less than the required false matching rate (Step A5). Step A5 may be performed anytime before Step A6, it may be in between of Steps 1 to 4, and may be before Step 1. Next, the overall threshold determination unit 13 obtains the threshold with which the required false matching rate can be achieved at required assurance rate based on the distribution of the individual thresholds obtained by the individual threshold distribution evaluation unit 12 (Step A6). Finally, the output device 18 outputs the obtained thresholds (Step A7).

According to the threshold determining device 10 of the present embodiment, it comprises the individual threshold evaluation unit 11, the individual threshold distribution evaluation unit 12, and the threshold determination unit 13, so that the threshold can be determined which achieves the prescribed false matching rate at the specific proportion. That is, the threshold is determined so that the prescribed value can be reached by non-matching rates of each data, not of the average of all data, by which the first object of the present invention can be achieved. Moreover, the threshold is determined at the time of system designing by using the test data, by which the second object of the present invention can be achieved.

Figure 3:
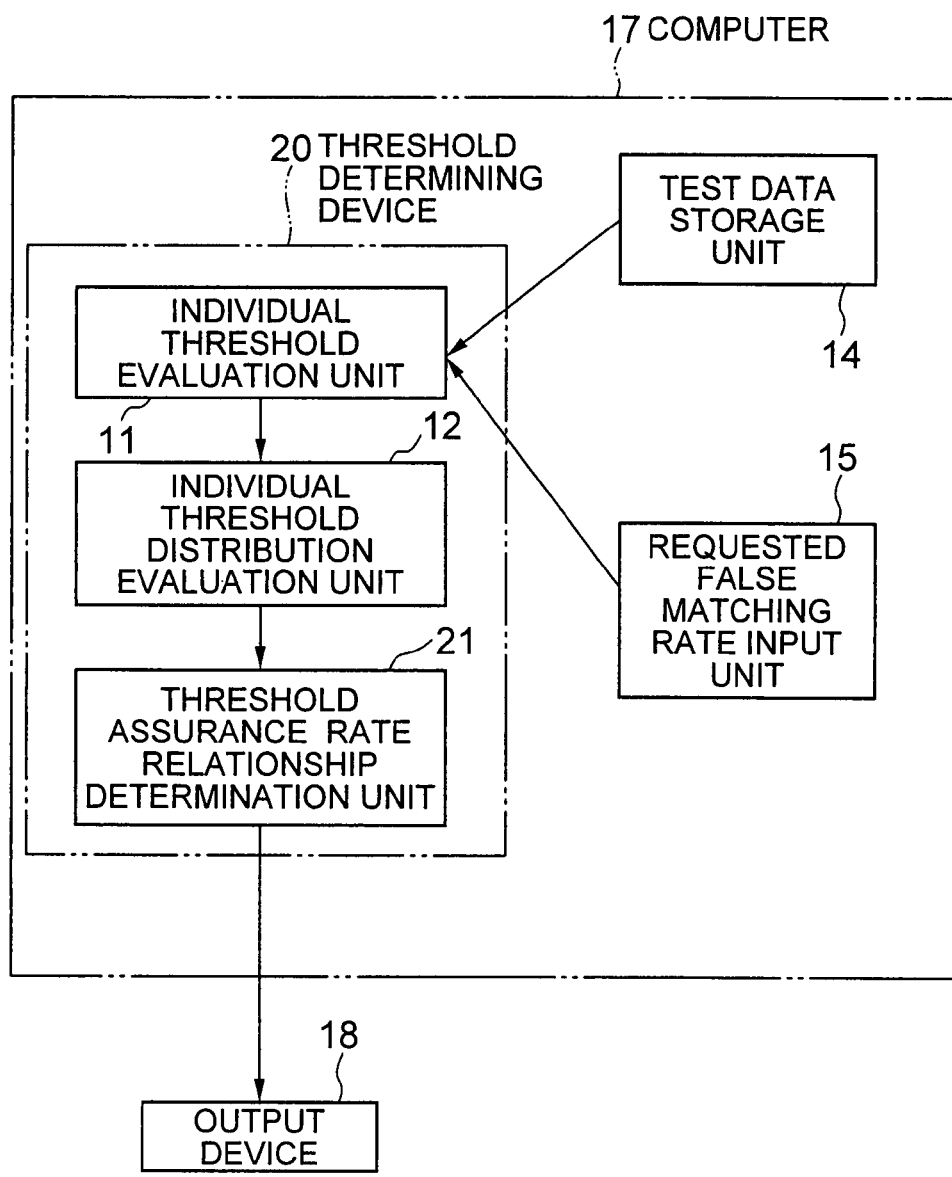
FIG. 3 is a block diagram showing a second embodiment of the threshold determining device according to the present invention.

FIG. 3 is a block diagram showing a second embodiment of the threshold determining device according to the present invention. Hereinafter, the present invention will be explained with reference to this drawing. In this regard, the description will be simplified using the same reference numerals for the same parts as in FIG. 1.

A threshold determining device 20 according to the present embodiment basically comprises the individual threshold evaluation unit 11, the individual threshold distribution evaluation unit 12, and a threshold assurance rate relationship determination unit 21. The threshold assurance rate relationship determination unit 21 obtains a relationship between the overall threshold and a proportion of data having the individual thresholds satisfying the overall threshold to the whole data, based on the distribution of the individual thresholds obtained by the individual threshold distribution evaluation unit 12. In the present embodiment, the threshold assurance rate relationship determination unit 21 is utilized for the calculation unit to obtain the overall threshold based on the distribution of the individual thresholds obtained by the individual threshold distribution evaluation unit.

The present invention will be explained in more detail. The threshold determining device 20 is realized within the computer 17 which operates with the program control. The computer 17 is connected with the output device 18 such as a display, and the like. The computer 17 has the individual threshold evaluation unit 11, the individual threshold distribution evaluation unit 12, and the threshold assurance rate relationship determination unit 21, and besides, the test data storage unit 14 and the required false matching rate input unit 15.

Each of these units generally operate as follows. The individual threshold evaluation unit 11, the individual threshold distribution evaluation unit 12, the test data storage unit 14, and the required false matching rate input unit 15 operate the same as each unit in the first embodiment. The threshold assurance rate relationship determination unit 21 obtains a relationship between the threshold and the proportion of data which can be assured to be less than the required matching rate inputted by the required false matching rate input unit 15, based on the distribution of the individual thresholds obtained by the individual threshold distribution evaluation unit 12. The output device 18 outputs a relationship between the evaluation value and the assurance rate obtained by the threshold assurance rate relationship determination unit 21.

Figure 4:
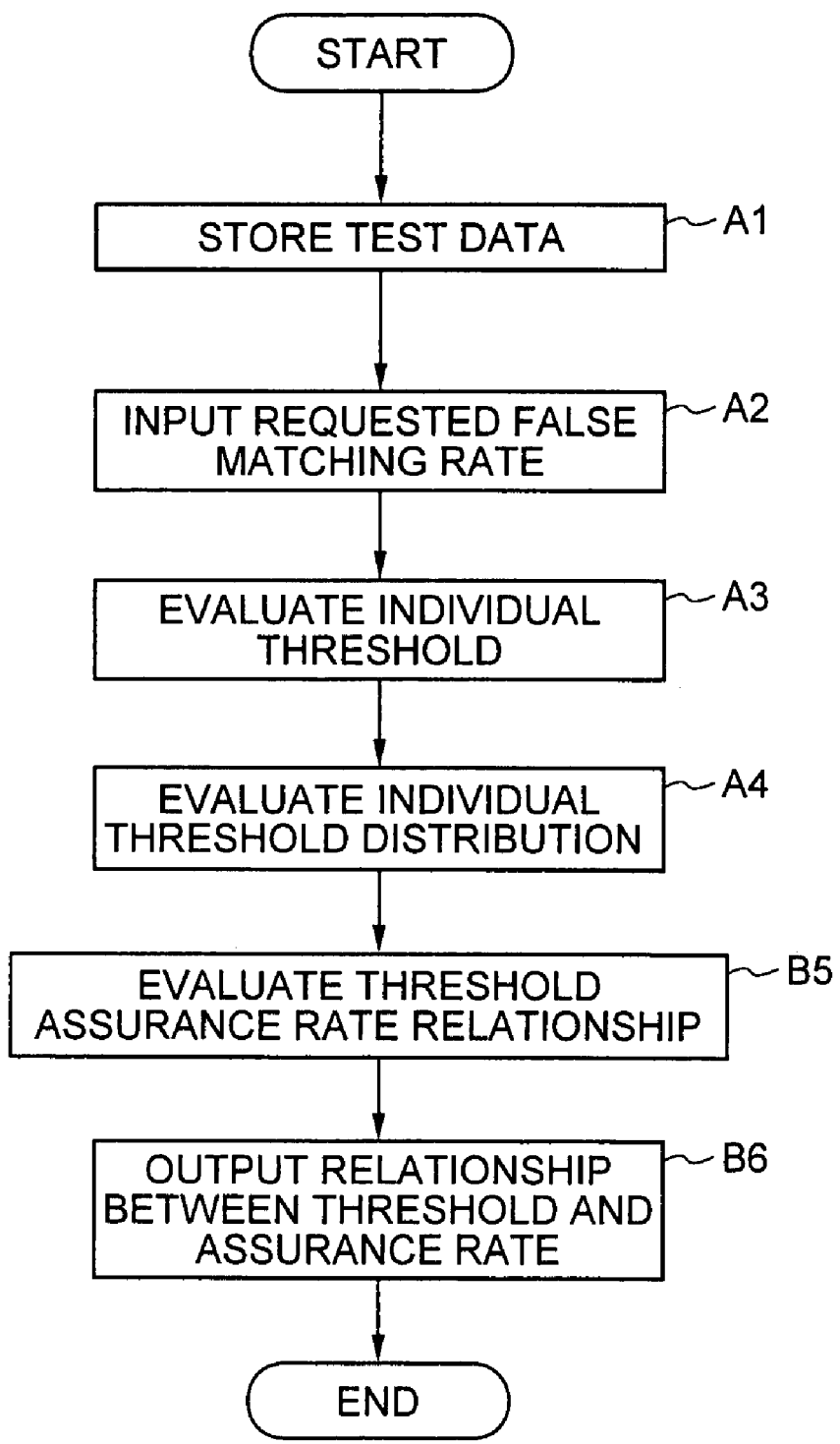
FIG. 4 is a flowchart showing operations of the threshold determining device of FIG. 3.

FIG. 4 is a flowchart showing operations of the threshold determining device 20. Hereinafter, the operations of the threshold determining device 20 will be explained with reference to FIGS. 3 and 4.

Descriptions about operations of each unit in Steps A1 to A4 are omitted because these are the same with operations of each step in Steps A1 to A4 in FIG. 2. Firstly, the threshold assurance rate relationship determination unit 16 obtains a relationship between the proportion, with which the false matching rates of each data less than the required false matching rate can be assured, and the threshold (Step B5). Subsequently, the output device 18 outputs the obtained relationship between the threshold and the assurance rate (Step B6).

According to the threshold determining device 20 of the present embodiment, an authentication using the overall threshold in accordance with the required level can be realized, in addition to an effect equivalent to the one of the first embodiment.

Figure 5:
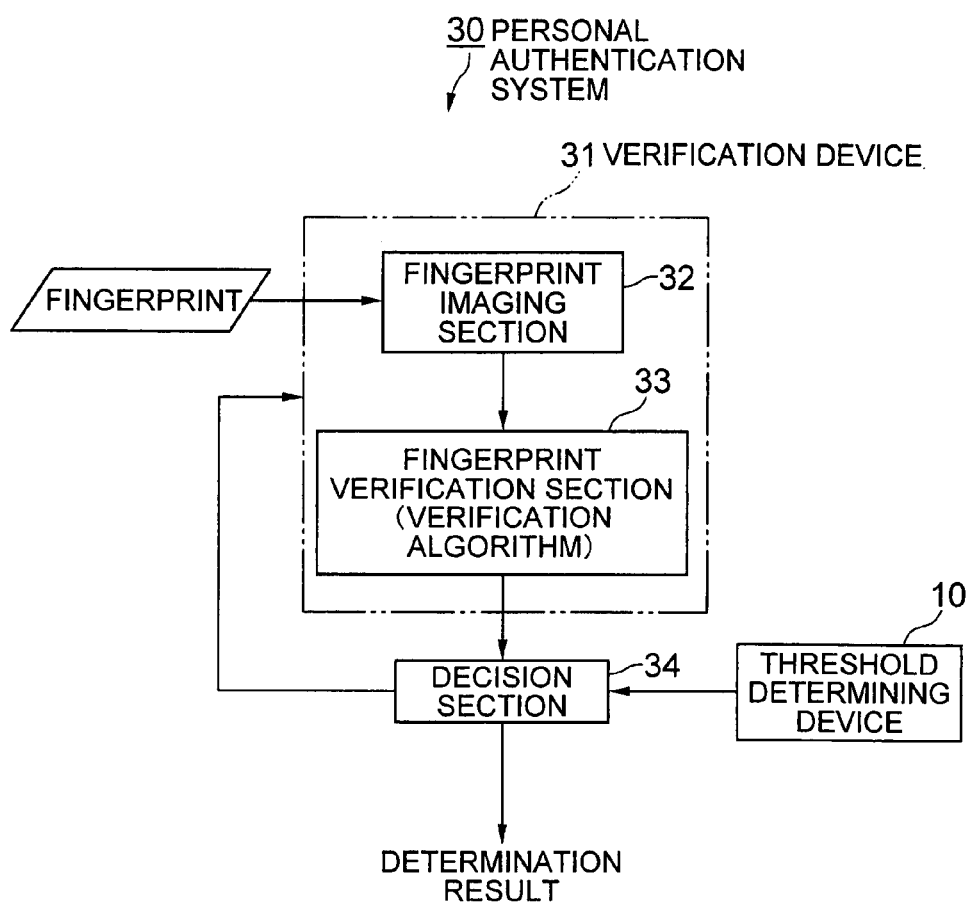
FIG. 5 is a block diagram showing one example of a personal authentication system using the threshold determining device according to the present invention.

FIG. 5 is a block diagram showing an example of the personal authentication system using the threshold determining device according to the present invention.
Hereinafter, the present invention will be explained with reference to this drawing.

The personal authentication system 30 uses fingerprints for biometric information identifying individuals, comprises a verification device 31 and the decision section 34, and is to perform personal authentication using the overall threshold obtained by threshold determining device 10 of the first embodiment. The verification device 31 includes a fingerprint imaging section 32 and a fingerprint verification section 33. The fingerprint imaging section 32 is such as a fingerprint scanner having a function of inputting fingerprints electronically. The fingerprint verification section 33 verifies a fingerprint newly inputted with a fingerprint enrolled in advance using a verification algorithm included therein. The decision section 34 determines whether it is the identical person or not using the overall threshold inputted by the threshold determining device 10 and the verified result outputted from the fingerprint verification section 33. The personal authentication system 30 is the same as the conventional one except a point where the overall threshold obtained by the threshold determining device 10 is used, therefore, detailed descriptions will be omitted.

In this regard, the threshold determining device 20 of the second embodiment may be used instead of the threshold determining device 10 to perform the personal authentication using the overall threshold in accordance with the required level of security in the authentication, based on the relationship obtained by the threshold determining device 20. In addition, the threshold determining devices 10 and 20 are provided outside of the fingerprint verification section 33 and the decision section 34, however, this is just one example. For instance, the threshold determining devices 10 and 20 may be inside of the fingerprint verification section 33 or the decision section 34.

Embodiment 1

The present embodiment is corresponding to the aforementioned first embodiment. Hereinafter, the present embodiment will be explained with reference to FIGS. 1, 2, and 5. In the present embodiment, a personal computer is used as the computer 17. A memory in the personal computer is used as the test data storage unit 14. In the required false matching rate input unit 15 and the required assurance input unit 16, values are inputted from the keyboard connected to the personal computer. Fingerprint data is used as the data, and the threshold is outputted which is utilized in the personal authentication system to perform the personal authentication using the fingerprint data.

In the required false matching rate input unit 15, required the false matching rate (the required false matching rate) is inputted. The required false matching rate is a prescribed value. With respect to the fingerprint authentication device using the threshold determined by the present embodiment, an occurrence rate of error in determining different fingerprint data as the identical fingerprint data mistakenly (a false matching rate) is required being smaller than the prescribed value, that is, the required false matching rate. For example, in a case where a threshold for a fingerprint authentication device is determined in which a possibility of determining different fingerprints data as the same fingerprints data is required to be smaller than 1/10000, 1/10000 is inputted from the required false matching rate input unit 15. In the required false matching rate input unit 15, a prescribed value can be inputted with the keyboard, but also stored in the memory in advance, also inputted through communication or an external recording medium.

The test data storage unit 14 stores fingerprint test data. The test data storage unit 14 can store fingerprint test data not only in the memory inside of the personal computer, but also in recording mediums such as hard discs, DVD mediums, and the like. Further, while data has been stored in a storage device outside of the personal computer, communication is performed through a network, and the test data storage device 14 can store only a portion of data required at the time with inputting the necessary data for verification sequentially.

In the required assurance rate input unit 16, required the assurance rate required (the required assurance rate) is inputted. The required assurance rate is a proportion to be assured that the false matching rates of each data are less than the required false matching rate in the whole data in a case where respective fingerprint data are verified with a number of fingerprints. For example, in a case where the required false matching rate is 1/10000, when 99% or more of the fingerprint data is desirably assured to have false matching rates smaller than 1/10000, that is, when possibility of the false matching rate being larger than the required value need to be controlled under 1%, the required assurance rate is to be 99%. In the required assurance input unit 16, a prescribed value can be inputted with the keyboard, but also stored in the memory in advance, also inputted through communication or an external recording medium.

In the individual threshold evaluation unit 11, thresholds with which false matching rates at each fingerprint test data are to be a required false matching rate are obtained. That is, each fingerprint data is evaluated its similarity to other test data. Then, thresholds, with which a probability of similarity exceeding the threshold becomes under the required false matching rate, are obtained for each of the fingerprints.

For example, assuming that the required false matching rate is 1/10000, and a certain fingerprint data (Fingerprint data 1) is verified with 60,000 fingerprints data. A threshold for the fingerprint data 1 is determined in a range where similarity becomes a certain value or more in the verification with not more than 6 fingerprints, which is 1/10000 of 60,000 fingerprints, and where similarity becomes less than the certain value in the verification with the rest, not less than 59,994 fingerprints. For example, assuming that the fingerprint data 1 is verified with 60,000 fingerprints data, and the 6 higher similarities are sequentially, 0.22, 0.20, 0.19, 0.18, 0.18, 0.17, and the rest, the similarities to 59,994 fingerprints, are less than 0.17. Here, the larger the number is, the more similar two of data are. In this case, the threshold for the fingerprint data 1 is to be more than 0.17. The thresholds of each data may be determined in this range arbitrarily, however, a high threshold is inconvenient because it increases the false non-matching rate (a ratio of determining the identical fingers as different fingers), so that the threshold is to be 0.17 which is the smallest in this range.

Thresholds for each data are different according to data. For example, assuming that fingerprint data 2 is verified with 60,000 fingerprints data, and the 6 higher similarities are sequentially 0.34, 0.32, 0.30, 0.29, 0.28, 0.25, and the rest, the similarities to 59,994 fingerprints, are less than 0.25. Then the individual thresholds for the fingerprint data 2 are in a range of 0.25 and more. Because the individual thresholds are different according to data, thresholds for the data are determined at each data, as shown in Table 1.

TABLE 1 one example of the individual thresholds at each fingerprint data

| <<Fingerprint data>> | <<Threshold>> |
|---|---|
| Fingerprint data 1 | 0.17 |
| Fingerprint data 2 | 0.25 |
| Fingerprint data 3 | 0.10 |
| ... | ... |
| Fingerprint data N | 0.23 |

Figure 6A:
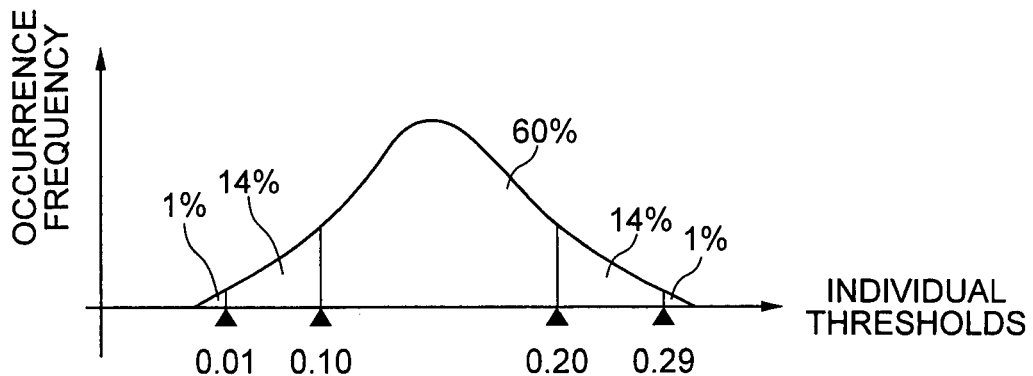
FIG. 6A is a graph showing one example of occurrence frequency distribution with respect to individual thresholds at each fingerprint data.

Hereinafter, thresholds for each data is called as the individual thresholds. In the individual threshold distribution evaluation unit 12, frequent distribution of individual thresholds at each data obtained by the individual threshold evaluation unit 11 is obtained. The frequent distribution of individual thresholds is to show proportions of each individual threshold to the whole data, for example, the proportion of the individual thresholds less than 0.01 to the whole data is 1%, from 0.01 to less than 0.1 is 14%, from 0.1 to less than 0.2 is 60%, from 0.2 to less than 0.29 is 14%, and 0.29 and over is 1%, as shown in FIG. 6A.

Figure 6B:
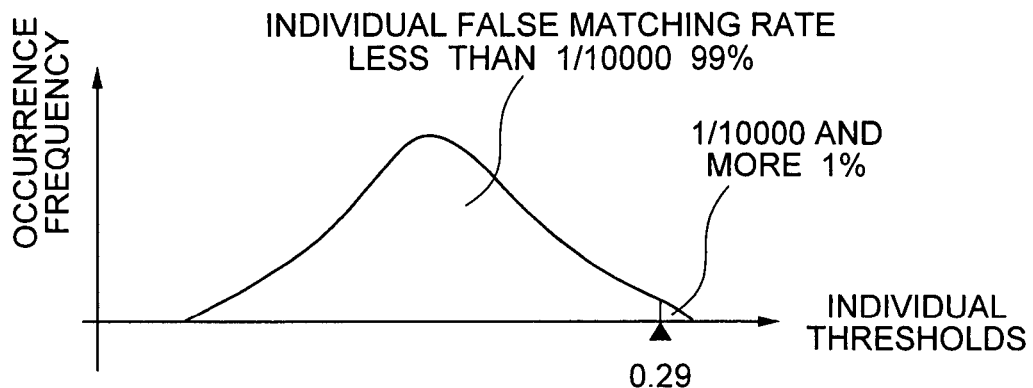
FIG. 6B is a graph showing one example of proportions of fingerprints data with which individual false matching rate is equal to a prescribed value or more, and fingerprints data with which individual false matching rate is less than the prescribed value, in a case with an overall threshold determined.

In the overall threshold determination unit 13, the threshold with which the required false matching rate can be assured at the required assurance rate is obtained in accordance with the distribution of the individual thresholds obtained by the individual threshold distribution evaluation unit 12. For example, assuming that the required false matching rate is 1/10000, the required assurance rate is 1%, and data with the individual thresholds being 0.29 and more is 1% in the distribution of the individual thresholds as shown in FIG. 6A, the overall threshold is to be 0.29 or more. In this case, the proportion of the individual false matching rates at each fingerprint data which is less than 1/10000 is to be one shown in FIG. 6B, and the proportion of the false matching rates at each data exceeding the required false matching rate, 1/10000, is to be 1% or less.

The overall threshold determined by the overall threshold determination unit 13 is outputted from the output device 18. In the output device 18, it can be shown on a display device such as a display, and be outputted after recorded in a storage device. When a fingerprint authentication device designed, the overall threshold shown on the display device is inputted, or the overall threshold recorded in the storage device is read out by the fingerprint authentication device, and thereby the fingerprint authentication device can be designed with the false matching rates at each data being equivalent to the required assurance rate or more, and besides, equivalent to the required false matching rate or less.

Embodiment 2

The present embodiment is corresponding to the aforementioned second embodiment. Hereinafter, the present embodiment will be explained with reference to FIGS. 3, 4, and 5. The present embodiment is different from the Embodiment 1 in that the required assurance rate input unit 15 (FIG. 1) is not provided, and that the threshold assurance rate relationship determination unit 21 is provided.

In the threshold assurance rate relationship determination unit 21, the relationship between the threshold and the assurance rate are obtained according to the distribution of the individual thresholds obtained by the individual threshold distribution evaluation unit 12. The relationship between the threshold and the assurance rate is a relationship which means a certain level of assurance of the false matching rate being less than the required false matching rate with respect to a certain threshold.

Figure 6C:
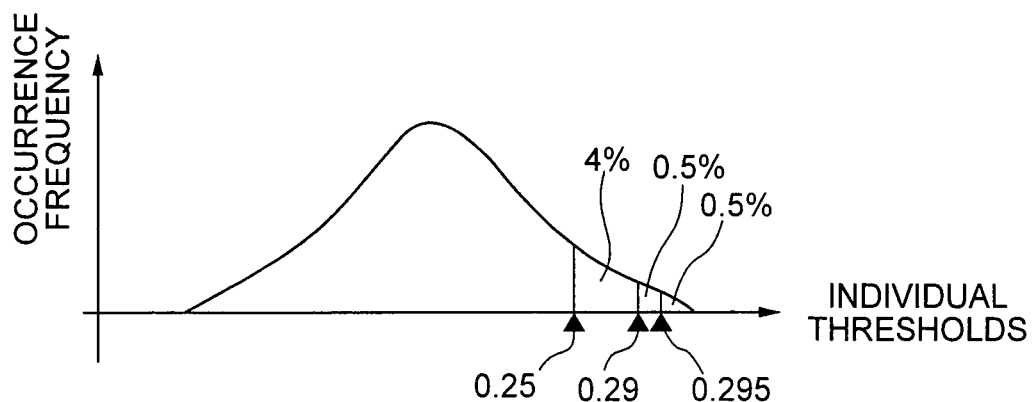
FIG. 6C is a graph showing one example of occurrence frequency distribution with respect to the individual thresholds at each fingerprint data.

For example, as in the individual threshold distribution in FIG. 6C, assuming that the proportion of the individual threshold from 0.25 to less than 0.29 is 4%, from 0.29 to less than 0.295 is 0.5%, and from 0.295 and more is 0.5%, that is, the individual thresholds 0.25 and more is 5% (less than 0.25 is 95%), 0.29 and more is 1% (less than 0.29 is 99%), 0.295 and more is 0.5% (less than 0.295 is 99.5%). In this case, as shown in Table 2, the individual false matching rates at each data being less than the required false matching rate can be assured by 95% when the threshold is 0.25, the individual false matching rate being less than the required false matching rate can be assured by 99% when the threshold is 0.29, and the individual false matching rate at each data being less than the required false matching rate can be assured by 99.5% when the threshold is 0.295.

TABLE 2 one example of the relationship between
the thresholds and the assurance rate.

| <<Thresholds>> | <<Assurance rate>> |
|---|---|
| ... | ... |
| 0.25 | 95% |
| 0.29 | 99% |
| 0.295 | 99.5% |
| ... | ... |

In the output device 18, the relationship between the thresholds and the assurance rate are outputted. Utilizing the relationship between the thresholds and the assurance rate, the fingerprint authentication device can be operated with variable assurance rate by varying the threshold in accordance with the authentication purposes. For example, when the fingerprint authentication is performed in the in-house information system, a threshold with which 99.9% can be assured is used for authenticating an access to highly confidential information, such as about personnel relations, and a threshold with which 99% can be assured is used for authenticating an access to information which is not in high level of confidentiality, as described, the thresholds can be varied depending on the level of confidentiality of information to be accessed.

In Embodiments 1 and 2, the descriptions have used the fingerprint data as the data. As a method for verifying a fingerprint, there is a way to utilize a minutia, such as an end point or a bifurcation of groove. Number of minutiae is different depending on fingerprints, and the false matching rates at each fingerprint data can be various due to the number of minutiae. In such a case, the false matching rates at each data are evaluated using the present embodiment, and thereby the fingerprint authentication system can be established where the false matching rates can be assured at the required assurance even if the number of minutiae are different between each fingerprint.

In Embodiments 1 and 2, the descriptions uses the fingerprint data as the data, however, other biometric information data capable of identifying an individual, such as face data, iris data, vessel data, can be utilized. The biometric information, which is unlike authentication data created artificially such as a code number, has large variations depending on individuals. Accordingly, the false matching rates can be various at each individual widely. If an authentication system is designed using the present embodiment, the biometric information authentication system capable of assuring the false matching rates at the required assurance can be established. In addition, not only biometric information such as the fingerprint data, but also other authentication data can be used.

In the embodiments 1 and 2, the similarity is used as the evaluation value of comparison result between two of fingerprints data, which described that the larger similarity means that the two of fingerprints data are more similar, and the larger number of threshold means that the more strict condition is required. However, as for the evaluation value, a measurement may be used showing the more similarity with the smaller number, such as a distance between two data, then the smaller threshold makes the more strict condition.

INDUSTRIAL AVAILABILITY

The present invention can be utilized for a threshold determining device for determining a threshold capable of assuring the required false matching rates at the required assurance. A threshold determined by the device can be utilized for designing a personal authentication system.

The invention claimed is:

1. A threshold determining device comprising:
an individual threshold evaluation unit for obtaining a verification evaluation value between a plurality of data for each data, and obtaining a threshold for the verification evaluation value satisfying a prescribed false matching rate as an individual threshold with respect to each data;
an individual threshold distribution evaluation unit for obtaining distribution of the individual thresholds having number of the data for each individual threshold with respect to the individual thresholds at each data obtained by the individual threshold evaluation unit; and
a calculation unit for obtaining a threshold common to all of the plurality of data as an overall threshold based on the distribution of the individual thresholds obtained by the individual threshold distribution evaluation unit.

2. The threshold determining device, as claimed in claim 1, wherein the verification evaluation value is similarity or distance information.

3. The threshold determining device, as claimed in claim 1, wherein the data is biometric information identifying an individual.

4. The threshold determining device, as claimed in claim 3, wherein the biometric information is fingerprint data.

5. A threshold determining device, comprising:
an individual threshold evaluation unit for obtaining a verification evaluation value between a plurality of data for each data, and obtaining a threshold for the verification evaluation value satisfying a prescribed false matching rate as an individual threshold with respect to each data;
an individual threshold distribution evaluation unit for obtaining distribution of the individual thresholds having number of the data for each individual threshold with respect to the individual thresholds at each data obtained by the individual threshold evaluation unit; and
a calculation unit for obtaining a relationship between an overall threshold and a proportion of data having the individual thresholds satisfying the overall threshold to the whole data based on the distribution of the individual thresholds obtained by the individual threshold distribution evaluation unit.

6. A personal authentication system performing authentication based on biometric data of authentication target comprising:
an individual threshold evaluation unit for obtaining a verification evaluation value between a plurality of data for each data, and obtaining a threshold for the verification evaluation value satisfying a prescribed false matching rate as an individual threshold with respect to each data;
an individual threshold distribution evaluation unit for obtaining distribution of the individual thresholds having number of the data for each individual threshold with respect to the individual thresholds at each data obtained by the individual threshold evaluation unit;
a calculation unit for obtaining a threshold common to all of the plurality of data as an overall threshold based on the distribution of the individual thresholds obtained by the individual threshold distribution evaluation unit; and
an authentication unit for performing personal authentication using the overall threshold obtained by the calculation unit.

7. A personal authentication system performing authentication based on biometric data of authentication target, comprising:
an individual threshold evaluation unit for obtaining a verification evaluation value between a plurality of data for each data, and obtaining a threshold for the verification evaluation value satisfying a prescribed false matching rate as an individual threshold with respect to each data;
an individual threshold distribution evaluation unit for obtaining distribution of the individual thresholds having number of the data for each individual threshold with respect to the individual thresholds at each data obtained by the individual threshold evaluation unit;
a calculation unit for obtaining a relationship between an overall threshold and a proportion of data having the individual thresholds satisfying the overall threshold to the whole data based on the distribution of the individual thresholds obtained by the individual threshold distribution evaluation unit; and
an authentication unit for performing personal authentication using the overall threshold obtained by the calculation unit.

8. A threshold determining method for obtaining a threshold for data verification comprising:
an individual threshold evaluation step of obtaining a verification evaluation value for each data in a plurality of data with respect to other data, and obtaining a threshold for the verification evaluation value satisfying a prescribed false matching rate with respect to each data as an individual threshold;
an individual threshold distribution evaluation step of obtaining distribution of the individual thresholds having number of the data for each individual threshold with respect to the individual thresholds at each data obtained in the individual threshold evaluation step; and
a calculation step of obtaining a threshold common to all of the plurality of data as an overall threshold based on the distribution of the individual thresholds obtained in the individual threshold distribution evaluation step.

9. The threshold determining method, as claimed in claim 8, further comprising setting a threshold of similarity or distance as the threshold of the verification evaluation value, and obtaining the threshold of the similarity or the distance as the individual threshold for each data.

10. The threshold determining method, as claimed in claim 8, wherein biometric information identifying an individual is used as the data.

11. The threshold determining method, as claimed in claim 10, wherein fingerprint data is used as the biometric information.

12. A threshold determining method, comprising:
an individual threshold evaluation step of obtaining a verification evaluation value for each data in a plurality of data with respect to other data, and obtaining a threshold for the verification evaluation value satisfying a prescribed false matching rate as an individual threshold;
an individual threshold distribution evaluation step of obtaining distribution of the individual thresholds having number of the data for each individual threshold with respect to the individual thresholds at each data obtained in the individual threshold evaluation step; and
a calculation step of obtaining a relationship between the overall threshold and a proportion of data having the individual thresholds satisfying the overall threshold to the whole data based on the distribution of the individual thresholds obtained in the individual threshold distribution evaluation step.

13. A personal authentication method for performing authentication based on biometric data of an authentication target, the method comprising:
an individual threshold evaluation step of obtaining a verification evaluation value between a plurality of data for each data, and obtaining a threshold for the verification evaluation value satisfying a prescribed false matching rate as an individual threshold with respect to each data;
an individual threshold distribution evaluation step of obtaining distribution of the individual thresholds having number of the data for each individual threshold with respect to the individual thresholds at each data obtained in the individual threshold evaluation step;
a calculation step of obtaining a threshold common to all of the plurality of data as an overall threshold based on the distribution of the individual thresholds obtained in the individual threshold distribution evaluation step; and
an authentication step of performing personal authentication using the overall threshold obtained in the calculation step.

14. A personal authentication method performing authentication based on biometric data of an authentication target comprising:
an individual threshold evaluation step of obtaining a verification evaluation value between a plurality of data for each data, and obtaining a threshold for the verification evaluation value satisfying a prescribed false matching rate as an individual threshold with respect to each data;
an individual threshold distribution evaluation step of obtaining distribution of the individual thresholds having number of the data for each individual threshold with respect to the individual thresholds at each data obtained in the individual threshold evaluation step;
a calculation step of obtaining a relationship between an overall threshold and a proportion of data having the individual thresholds satisfying the overall threshold to the whole data based on the distribution of the individual thresholds obtained in the individual threshold distribution evaluation step; and
an authentication step of performing personal authentication using the overall threshold obtained in the calculation step.

15. A non-transitory computer readable recording medium storing a threshold determining program which makes a computer constituting a threshold determining device for determining a threshold execute:
an individual threshold evaluation function of obtaining a verification evaluation value between a plurality of data for each data, and obtaining a threshold of the verification evaluation value satisfying a prescribed false matching rate as an individual threshold for each data;
an individual threshold distribution evaluation function of obtaining distribution of the individual thresholds having number of the data for each individual threshold with respect to the individual thresholds at each data obtained by the individual threshold evaluation function; and
a calculation function of obtaining a threshold common to all of the plurality of data as an overall threshold based on the distribution of the individual thresholds obtained by the individual threshold distribution evaluation function.

16. The non-transitory computer readable recording medium, as claimed in claim 15, which makes the computer execute the function of obtaining a threshold for similarity or distance as the threshold of the verification evaluation value for each data as the individual threshold.

17. The non-transitory computer readable recording medium, as claimed in claim 15, wherein biometric information identifying an individual is used as the data.

18. The non-transitory computer readable recording medium, as claimed in claim 17, wherein fingerprint data is used as the biometric information.

19. A non-transitory computer readable recording medium storing a threshold determining program which makes a computer constituting a threshold determining device for determining a threshold execute
an individual threshold evaluation function of obtaining a verification evaluation value between a plurality of data for each data, and obtaining a threshold of the verification evaluation value satisfying a prescribed false matching rate as an individual threshold for each data;
an individual threshold distribution evaluation function of obtaining distribution of the individual thresholds having number of the data for each individual threshold with respect to the individual thresholds at each data obtained by the individual threshold evaluation function; and
a calculation function of obtaining a relationship between an overall threshold and a proportion of data having the individual threshold satisfying the overall threshold to the whole data based on the distribution of the individual thresholds obtained by the individual threshold distribution evaluation function.

20. A non-transitory computer readable recording medium storing a personal authentication program which makes a computer constituting a personal authentication system performing authentication based on biometric data of an authentication target execute:
an individual threshold evaluation function of obtaining a verification evaluation value between a plurality of data for each data, and obtaining a threshold of the verification evaluation value satisfying a prescribed false matching rate as an individual threshold for each data;
an individual threshold distribution evaluation function of obtaining distribution of the individual thresholds having number of the data for each individual threshold with respect to the individual thresholds at each data obtained by the individual threshold evaluation function;
a calculation function of obtaining a threshold common to all of the plurality of data as an overall threshold based on the distribution of the individual thresholds obtained by the individual threshold distribution evaluation function; and
an authentication function of performing personal authentication using the overall threshold obtained by the calculation function.

21. A non-transitory computer readable recording medium storing a personal authentication program which makes a computer constituting a personal authentication system performing authentication based on biometric data of authentication target execute
- an individual threshold evaluation function of obtaining a verification evaluation value between a plurality of data for each data, and obtaining a threshold of the verification evaluation value satisfying a prescribed false matching rate as an individual threshold for each data;
- an individual threshold distribution evaluation function of obtaining distribution of the individual thresholds having number of the data for each individual threshold with respect to the individual thresholds at each data obtained by the individual threshold evaluation function;
- a calculation function of obtaining a relationship between an overall threshold and a proportion of data having the individual threshold satisfying the overall threshold to the whole data based on the distribution of the individual thresholds obtained by the individual threshold distribution evaluation function; and
- an authentication function of performing personal authentication using the overall threshold obtained by the calculation function.

\* \* \* \* \*

UNITED STATES PATENT AND TRADEMARK OFFICE
CERTIFICATE OF CORRECTION

| | | |
|---|---|---|
| PATENT NO. | : 7,991,204 B2 | Page 1 of 1 |
| APPLICATION NO. | : 11/792840 | |
| DATED | : August 2, 2011 | |
| INVENTOR(S) | : Akira Monden | |

It is certified that error appears in the above-identified patent and that said Letters Patent is hereby corrected as shown below:

ON THE TITLE PAGE:

Item (86) should read, PCT No.:  PCT/JP2006/300284

Signed and Sealed this
Twenty-seventh Day of September, 2011

David J. Kappos
*Director of the United States Patent and Trademark Office*